United States Patent Office 3,562,294
Patented Feb. 9, 1971

3,562,294
INDOLYL-2-AMINO-2-METHYLPROPANONES
Robert F. Parcel and Joseph P. Sanchez, Ann Arbor,
Mich., assignors to Parke, Davis & Company, Detroit,
Mich., a corporation of Michigan
No Drawing. Filed Aug. 13, 1968, Ser. No. 752,167
Int. Cl. C07d 27/56
U.S. Cl. 260—326.15    8 Claims

ABSTRACT OF THE DISCLOSURE

Indolyl-2-amino-2-methylpropanone free base (I) and acid addition salt compounds

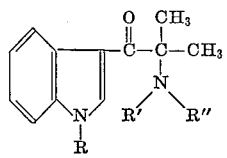

I are prepared
(1) by rearrangement of the corresponding 1-alkyl-N-{[2-methyl-1-(indol-3 - yl)propylidene]amino}quaternary ammonium salt,
(2) by reduction of corresponding 2-azido-1-indolyl-2-methylpropanone,
(3) by alkylation of the indole nitrogen or the 2-amino group of a corresponding des-N-alkylpropanone, or
(4) by amination of the corresponding 2-halo-1-indolyl-2-methylpropanone; where R is hydrogen, methyl, ethyl or allyl and R' and R" represent hydrogen, methyl or ethyl. The compounds possess pharmacological properties and are useful psychotropic agents for treating hyper-emotionality and hyper-irritability.

SUMMARY AND DETAILED DESCRIPTION

This invention relates to novel indolylaminomethylpropanone compounds and means of producing the same. More particularly, the invention relates to indolyl-2-amino-2-methylpropanone compounds and acid addition salts thereof represented in free base form by the formula

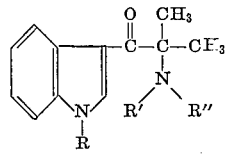

I where R is hydrogen, methyl, ethyl or allyl and R' and R" are the same or different and represent hydrogen, methyl or ethyl.

The compounds of the invention can be prepared in various ways. According to one embodiment, the compounds of Formula I where R' and R" represent hydrogen can be prepared by reacting a 1-alkyl-N-{[2-methyl-1-(indol-3-yl))propylidene]amino}quaternary ammonium salt compound of formula

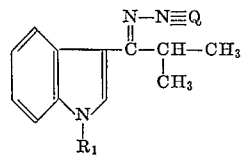

II with an alkali metal alkoxide or hydroxide in the presence of a solvent and subjecting the reaction product to acid hydrolysis; where $R_1$ is hydrogen, methyl or ethyl and

—N≡Q is a quaternary ammonium group and, more specifically, a trialkylammonium, N-alkyl piperidinium or N-alkyl pyrrolidinium group, the alkyl substituents of the latter being $C_1$ to $C_4$ alkyl groups and preferably a methyl group. The nature of the quaternary ammonium salt group is not critical since the group is removed in the process. The reaction is carried out in a solvent such as a lower alkanol. Alkanols and particularly ethanol and isopropanol are preferred solvents. The reaction conditions can be varied widely. The reaction is usually carried out at temperatures ranging from —10 to 100° C. In this temperature range the reaction is complete within one-half to 24 hours. After completion of the reaction the reaction mixture is treated with an acidic hydrolysis catalyst and the hydrolysis product is isolated in free base or acid addition salt form. Mineral acids such as hydrochloric or sulfuric acid are preferred acid catalysts.

Also according to the invention, the products where R' and R" represent hydrogen are prepared by reduction of a 2-axido-1-indolyl-2-methylpropanone having the formula

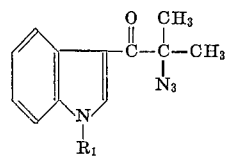

III where $R_1$ has the above-specified significance. The reduction can be carried out catalytically or chemically. Suitable catalysts for the reaction are Raney nickel, palladium, palladium on charcoal and similar catalysts. Catalytic reduction is ordinarily carried out at hydrogen pressures ranging from atmospheric to 200 p.s.i. and preferably about 50 p.s.i. The reaction can be carried out at temperatures ranging from about 20 to 100° C. The time required for completion of the reaction at these temperatures is about 24 hours or less. Any of various solvents can be used for hydrogenation such as aqueous and non-aqueous lower alkanols, acid-alkanol mixtures, tetrahydrofuran, dioxane and similar solvents. Chemical reduction is carried out using conventional chemical agents and means such as iron/water, tin/hydrochloric acid, zinc/acetic acid and other such agents.

According to another embodiment, compounds of the invention having Formula I where R is methyl, ethyl or allyl are produced by alkylation of the indolyl nitrogen of compounds having the formula

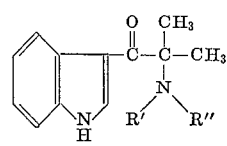

IV where R' and R" are as specified. The reaction is carried out with an aliphatic ester alkylating agent such as a methyl, ethyl or allyl halide, sulfate, sulfonate or the like, in the presence of a strong base in an inert solvent. Suitable bases are alkali metal hydride, amides and tertiary alkoxides. Sodium hydride is a preferred base. Various solvents can be used such as aromatic hydrocarbons, dimethylformamide, ethers such as tetrahydrofuran or dioxane, and dimethyl sulfoxide. Dimethyl sulfoxide is a preferred solvent. For the reaction, equivalent amounts of reactants are generally employed, although a slight excess of alkylating agent may be used. The reaction is exothermic and is essentially complete within a short period after the start of the reaction, usually within about 15 minutes.

According to still another embodiment of the invention, compounds having Formula I where at least one R' and R" represents methyl or ethyl are prepared by alkylation of the corresponding indolyl-2-amino-2-methylpropanone of formula

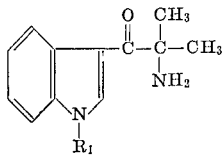

V in the presence of base in an inert solvent; where $R_1$ is hydrogen, methyl or ethyl. The reaction is carried out with an alkylating agent such as a methyl or ethyl halide, sulfate, sulfonate or the like. Any of various bases can be used such as an alkali metal carbonate or bicarbonate, alkaline earth metal carbonate, oxide or hydroxide, organic tertiary amine or the like. Potassium carbonate is a preferred base. Any of a variety of solvents can be used such as acetone, methyl ethyl ketone, methanol, ethanol, tetrahydrofuran, dioxane, acetonitrile, dimethylformamide and mixtures of these solvents or other similar solvents. Acetone and aqueous lower alkanols are preferred. The propanone starting material and alkylating agent are used in equivalent amounts or, preferably, a slight to moderate excess of alkylating agent is employed. The time and temperature for the reaction can be varied. The reaction is usually carried out at temperatures ranging from $-20$ to $150°$ C. for periods ranging from 3 to 72 hours. The reaction is conveniently carried out at the reflux temperature of the reaction mixture.

In another embodiment of the invention, compounds having Formula I where R, R′ and R″ represent hydrogen, methyl or ethyl are prepared by reacting a 2-halo-1-indolyl-2-methylpropanone of formula

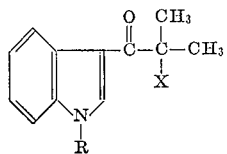

VI with an amine of formula HNR′R″ in the presence of solvent, where X is a chlorine or bromine atoms and R, R′ and R″ have the same significance. The proportion of reactants can be varied but an excess of amine is ordinarily employed. If desired, the reactants can be used in equivalent amounts if an inorganic base such as potassium carbonate or sodium bicarbonate is used in the reaction to consume the hydrohalic acid generated. Suitable solvents for the reaction include aromatic hydrocarbons, ethers, lower alkanols and alkanones, tertiary amides, acetonitrile, dimethyl sulfoxide, excess amine reactant or other such solvents. Methanol is a preferred solvent for the reaction. The reaction is carried out at temperatures ranging from about 0 to 175° C. for 1 to 72 hours, preferably at the reflux temperature of the reaction mixture.

The products of the invention can be isolated by conventional procedures as the free base or, if desired, as the corresponding acid addition salt. The free bases form pharmaceutically acceptable acid addition salts with a variety of inorganic and organic acids. Such acids, for illustration, include hydrochloric, hydrobromic, sulfuric, acetic, benzoic, citric, tartaric, maleic, malic, gluconic and ascorbic acids and related acids. The acid addition salts, formed conveniently by admixture of the free base with a selected acid, are equivalent to the free bases for purposes of the invention and in specific applications are preferred for their higher water solubility.

The invention is illustrated by the following examples:

EXAMPLE 1

(a) A boiling solution of sodium ethoxide (prepared from 12 g. of sodium and 400 ml. of absolute ethanol) is treated with 170 g. of 1-methyl-1-{[2-methyl-1-(1-methylindol-3-yl)-propylidene]amino}piperidinium iodide and the resulting solution stirred at reflux for 18 hours. On cooling, the mixture is acidified using 250 ml. of 1.68 N hydrochloric acid and then concentrated to remove ethanol. After addition of 500 ml. of water, the aqueous solution is washed with ether and made strongly basic with dilute sodium hydroxide. Ether extracts of this mixture are dried over anhydrous magnesium sulfate and concentrated to dryness. The free base product, 2-amino-2-methyl-1-(1-methylindol-3-yl)-1-propanone, which remains, is taken up in isopropanol. The isopropanolic solution is treated with anhydrous hydrogen chloride and chilled thoroughly to precipitate the monohydrochloride salt; D.P. 332–333° C. after recrystallization from methanol-isopropanol.

(b) The starting material for the above procedure can be prepared as follows:

A solution of 187 g. of 1-indol-3-yl-2-methyl-1-propanone and 250 ml. of dimethyl sulfoxide is carefully added to a suspension of 46 g. of a 54.3% mineral oil dispersion of sodium hydride and 250 ml. of dimethyl sulfoxide so as to maintain the temperature below 20° C. Upon completion of addition, the mixture is warmed at 40° C. until hydrogen evolution ceases and then cooled for addition of 156 g. of methyl iodide below 30° C. After this addition, the reaction mixture is heated at 40° C. for 15 minutes and then poured into 4 liters of ice water. A toluene solution of the precipitate, collected on filtering the aqueous mixture, is washed with water, dried over anhydrous magnesium sulfate, and then concentrated. The residue is triturated with petroleum ether to yield 2-methyl-1-(1-methylindol-3-yl)-1-propanone; M.P. 75–77° C.

A solution of 128 g. of 2-methyl-1-(1-methylindol-3-yl)-1-propanone, 100 g. of 1-aminopiperidine, 3 g. of p-toluenesulfonic acid monohydrate, and 400 ml. of toluene is refluxed until the calculated amount of water is collected (about 148 hours). The resulting solution is cooled, washed with dilute sodium hydroxide and water, and then dried over anhydrous magnesium sulfate and filtered. The filtrate is concentrate to provide 1-methyl-3-[2-methyl-1-(1-piperidinoimino)propyl]indole.

A solution of 180 g. of 1-methyl-3-[2-methyl-1-(piperidinoimino)propyl]indole, 128 g. of methyl iodide, and 200 ml. of acetonitrile is allowed to stand 3 days and is then concentrated. The residue is dissolved in 300 ml. of isopropanol and this solution is diluted with 1500 ml. of ether. After stirring and chilling, the product separates and is collected. The product is 1-methyl-1-{[2-methyl-1-(1 - methylindol-3-yl)propylidene]amino} - piperidinium iodide; melting point range, 135–150° C.

EXAMPLE 2

(a) To a mixture of 100 ml. of ethanol, 25 ml. of water, and 12 g. of reduced iron powder stirring at reflux, is added a solution of 24 g. of 2-azido-1-indol-3-yl-2-methyl-1-propanone and 0.5 ml. of concentrated hydrochloric acid. After refluxing 18 hours, the resulting mixture is filtered and the filtrate concentrated. An ethereal solution of the residue is washed with water, dried over anhydrous magnesium sulfate, and concentrated. The product, 2 - amino - 1 - indol-3-yl-2-methyl-1-propanone, M.P. 168–174° C., is obtained by trituration of the residue with an ether-petroleum ether mixture.

(b) The starting material for the procedure of paragraph (a) can be prepared as follows:

To a stirring suspension of 227 g. of trimethylphenylammonium bromide and 1300 ml. of tetrahydrofuran, is added dropwise 160 g. of bromine. Twenty minutes after addition is complete, the solution is further treated with 187 g. of 1-indol-3-yl-2-methyl-1-propanone and the resulting mixture allowed to stir 20 hours at 35–40° C. After filtration to remove trimethylphenylammonium bromide, the mixture is concentrated and the residue diluted by the addition of toluene. Toluene is then removed by evaporation and the residue diluted by addition of petroleum ether. The product, 2-bromo-1-indol-3-yl-2-methyl-1-propanone, is collected by filtration, M.P. 176–178° C., after recrystallization from xylene.

To a stirring suspension of 33 g. of sodium azide and 400 ml. of dimethyl sulfoxide, is added portionwise 89 g. of 2 - bromo - 1 - indol-3-yl-2-methyl-1-propanone. The mildly exothermic reaction which ensues is allowed to stir 2 hours and is then diluted by the addition of 4 liters of ice water. Ether extracts of the aqueous mixture are washed with water, dried over anhydrous magnesium sulfate, treated with activated charcoal, and then concentrated. The residual product is 2-azido-1-indol-3-yl-2-methyl-1-propanone; M.P. 104°106° C. after recrystallization from ether-petroleum ether.

(c) An alternative procedure to the one of paragraph (a) is the following:

To a mixture of 74 g. of 2-azido-1-indol-3-yl-2-methyl-1-propanone, 50 ml. of water, 500 ml. of ethanol and 5 g. of 10% palladium on charcoal stirring at 70°, is carefully added 50 ml. of formic acid. After the exothermic reaction subsides, the mixture is refluxed one hour and then concentrated. An aqueous solution, formed by addition of 800 ml. of water to the residue, is treated with activated charcoal and made strongly alkaline with sodium hydroxide. On chilling, this mixture is filtered to obtain the free base, 2 - amino-1-indol-3-yl-2-methyl-1-propanone; M.P. 172–174° C. after recrystallization from isopropanol-petroleum ether.

To obtain the hydrochloric acid addition salt, an isopropanolic solution of the free base is treated with isopropanolic hydrogen chloride to precipitate the hydrochloric salt; M.P. 333–334° C. after recrystallization from methanol-ether.

EXAMPLE 3

A mixture of 120 g. of 2-azido-1-(1-ethylindol-3-yl)-2-methyl-1-propanone, 2 g. of 20% palladium on charcoal, and 1200 ml. of methanol is hydrogenated at 50 p.s.i. for 40 minutes. At this point, catalyst is removed by filtration and the filtrate concentrated to dryness. An ether solution of the residue is extracted with aqueous hydrochloric acid, the acid layer being filtered to remove amine hydrochloride. The filtrate is alkalinized for extraction with ether. These extracts are dried over anhydrous magnesium sulfate and concentrated to a residual material which is dissolved in isopropanol and treated with isopropanolic hydrogen chloride. The resulting product, 2-amino-1-(1-ethylindol - 3 - yl)-2-methyl-1-propanone monohydrochloride, is collected and recrystallized from methanol-isopropanol-ether; M.P. 333–336° C.

The free base is obtained by dissolving the hydrochloride in water, adding potassium carbonate, and extracting with ether. The hydrobromide and sulfate are obtained by treating the free base with dry hydrogen bromide and with sulfuric acid. A salt with citric acid is obtained by mixing a solution of the free base in methanol with a solution of citric acid in methanol and concentrating the mixture.

The starting material for the procedure of the foregoing paragraph can be prepared by the procedure of Example 1(b) using ethyl iodide in place of methyl iodide to obtain 1 - (ethylindol-3 - yl)-2 - methyl-1 - propanone (M.P. 80–82° C.) which in turn is converted to 2-bromo-1-(1-ethylindol - 3-yl) - 2-methyl - 1-propanone (M.P. 90–92° C.) by the procedure of Example 2(b). The latter is then converted to 2-azido-1-(1-ethylindol-3-yl)-2-methyl-1-propanone by reaction with sodium azide according to the procedure of Example 2(b).

EXAMPLE 4

A solution of 22 g. of 2-amino-1-indol-3-yl-2-methyl-1-propanone (Example 2(a)) and 50 ml. of dimethyl sulfoxide is carefully added to a suspension of 4.6 g. of a 54.3% mineral oil dispersion of sodium hydride and 10 ml. of dimethyl sulfoxide so as to maintain the temperature below 20° C. After addition is complete, the mixture is warmed at 40° C. until hydrogen evolution ceases and then cooled again for addition of 8 g. of allyl chloride at temperatures below 35° C. The resulting mixture is then warmed at 40° C. for 15 minutes before it is poured into 1.5 liters of ice water mixture. Ether extracts of the aqueous mixture are washed with water, dried over anhydrous magnesium sulfate, and then concentrated. The free base product is taken up in isopropanol and the isopropanolic solution is treated with isopropanolic hydrogen chloride. The product which separates, 1-(1-allylindol - 3-yl) - 2-amino-2-methyl-1-propanone monohydrochloride, is collected; M.P. 283–284° C. after recrystallization from isopropanol.

(b) By a similar procedure but starting with the corresponding 2-ethylamine and 2-dimethylamine there are obtained 1-(1-allylindol - 3-yl) - 2-(ethylamino) - 2-methyl-1-propanone monohydrochloride, M.P. 270–272° C.; and 1-(allylindol - 3-yl) - 2-(dimethylamino) - 2-methyl-1-propanone monohydrochloride, M.P. 358–260° C.

EXAMPLE 5

A mixture of 14 g. of 2-amino-1-indol-3-yl-2-methyl-1-propanone (Example 2(a)), 200 ml. of acetone, 35 g. of anhydrous potassium carbonate, and 12 g. of ethyl iodide is stirred at room temperature overnight and then refluxed for 4 hours. The resulting mixture is concentrated and its residue diluted with 500 ml. of water and 750 ml. of ether. After thorough shaking, the ether layer is separated for washing with water and subsequent drying over anhydrous magnesium sulfate. Concentration yields the desired product, 2-(ethylamino)-1-indol - 3-yl - 2-methyl-1-propanone; M.P. 134–135° C. after recrystallization from cyclohexane-toluene-petroleum ether.

By the same procedure, but substituting 24.6 g. of methyl iodide for 12 g. of ethyl iodide, the product obtained is 2-(dimethylamino) - 1-indol - 3-yl - 2-methyl-1-propanone; M.P. 138–139° C. after recrystallization from cyclohexane-petroleum ether. Using a similar procedure but starting with 2-amino-2-methyl-1-(1-methyl-indol-3-yl)-1-propanone the product obtained is 2-(dimethylamino) - 2-methyl - 1-(1 - methylindol-3 - yl)-1-propanone; M.P. 141–143° C. after recrystallization from cyclohexane-petroleum ether.

Also by the same procedure but starting with 1-(ethyl-indol-3-yl)-2-methyl-1-propane and using as the alkylating agent ethyl iodide (1:1 molar ratio) and methyl iodide (1:2 molar ratio), the products obtained as the hydrochloride salt are 2-(ethylamino) - 1-(1-ethylindol-3-yl)-2-methyl-1-propanone monohydrochloride (D.P. 290–292° C. and 2-(dimethylamino) - 1-(1 - ethylindol-3-yl)-2-methyl-1 - propanone monohydrochloride (D.P. 260–262° C.).

EXAMPLE 6

A solution of 28 g. of 2-bromo-2-methyl-1-(1-methyl-indol-3-yl)-1-propanone and 125 ml. of methanol is twice refluxed for 3 hours after saturation by ethylamine. The resulting mixture is concentrated. The residue is diluted with ether, washed with dilute aqueous sodium hydroxide and water, and extracted with dilute hydrochloric acid. The extracts are alkalinized and then extracted with ether. After drying over anhydrous magnesium sulfate, the ether extracts are concentrated, dissolved in isopropanol and treated with isopropanolic hydrogen chloride. The product which separates, 2-(ethylamino) - 2-methyl - 1-(1-methylindol-3-yl)-1 - propanone monohydrochloride, is collected by filtration; M.P. 329–330° C. after recrystallization from isopropanol. The free base is obtained by dissolving the hydrochloride in water, adding sodium carbonate, and extracting with ether. A salt with tartaric acid is obtained by reacting the free base with tartaric acid in methanol.

The starting material for the above procedure (M.P. 178–179° C.) can be obtained by the bromination procedure of Example 2(b) substituting 201 g. of 2-methyl-1-(1-methylindol - 3-yl) - 1-propanone for 187 g. of 1-(indol-3-yl)-2-methyl-1-propanone.

The products of the invention in free base form and acid addition salt form are useful pharmacological agents. They produce a favorable effect on the hyperemotionality resulting from brain damage. Such activity can be demonstrated by measuring their ability to reduce septal hyperirritability. In this test procedure, the septal area of the forebrain of rats is first destroyed by electrocoagulation. Three days later the animals are examined and rated for hyperirritability by observing the intensity of each animal's response to four different stimuli: (1) a strong tactile stimulus administered as a prod on the back, (2) a stimulus resulting from attempting to pick up the animal with a gloved hand, (3) a visual stimulus produced by slowly moving rubber-tipped crucible tongs toward the face of the animal, and (4) a mild tactile stimulus produced by blowing a puff of air on the back of the animal. For each stimulus the ratings are −1 for a response less than expected from an unoperated rat; 0 for a respones equivalent to that expected from an unoperated rat; +1 for a moderately exaggerated response; and +2 for a highly exaggerated response. Thus, the maximum possible score for hyperirritability in a rat is 8. Only animals scoring 6 or more on the third day after operation are used in the test procedure. The animals are graded prior to dosing and thereafter at 0.5, 1, 2, 3 and 5 hours after dosing, or after other selected time periods. In this test procedure the products typically cause a significant suppression of hyperirritability following doses of about 25 to 45 mg./kg. intraperitoneally. The products suppress the hyperirritability of septal lesioned rats without causing the profound generalized depression associated with the use of tranquilizers and sedative-hypnotic drugs in this test procedure.

The activity of the products can also be demonstrated by their ability to suppress the mouse-killing instinct in so-called killer rats. A small percentage of rats (about 11% of the male Sprague-Dawley strain) spontaneously attack and kill a mouse introduced into the cage. In this test procedure a mouse is placed in the home cage of each killer rat 30 minutes after the rat has been treated with a test drug. The rat is observed for a period of 30 minutes thereafter. It is known that various types of drugs are capable of suppressing this mouse-killing instinct. For example, sedative drugs are effective at dose levels producing generalized depression; and stimulants are effective at dose levels producing visible excitement. Antidepressant drugs known to be useful in the treatment of endogenous depressions suppress mouse-killing at dose levels which do not produce other obvious effects. Similarly, the products of the invention suppress mouse-killing at dose levels which produce no other obvious changes in the behavior of the caged rat. The median effective dose, that is the dose estimated to suppress the killing instinct of 50% of the rats, ranges from about 5 to 25 mg./kg. given intraperitoneally.

We claim:
1. An amine compound of the group consisting of indolyl-2-amino-2-methylpropanones and pharmaceutically acceptable acid addition salts thereof represented in free base form by the formula

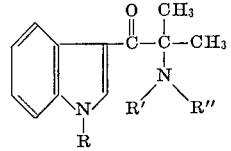

where R is a member selected from the group consisting of hydrogen, methyl ethyl or allyl, and R′ and R″ are the same or different and are members selected from the group consisting of hydrogen, methyl and ethyl.

2. A compound according to claim 1 which compound is 2-amino-1-indol-3-yl-2-methyl-1-propanone.

3. A compound according to claim 1 which compound is 2-(ethylamino)-1-indol-3-yl-2-methyl-1-propanone.

4. A compound according to claim 1 which compound is 2-(dimethylamino)-1-indol-3-yl-2-methyl-1-propanone.

5. A compound according to claim 1 which compound is 2-amino-2-methyl-1-(1-methylindol-3-yl)-1-propanone hydrochloride.

6. A compound according to claim 1 which compound is 2 - (ethylamino)-2-methyl-1-(1-methylindol-3-yl)-propanone hydrochloride.

7. A compound according to claim 1 which compound is 1-(1-allylindol-3-yl)-2-amino-2-methyl-1-propanone hydrochloride.

8. A compound according to claim 1 which compound is 1 - (1 - allylindol-3-yl)-2-(ethylamino)-2-methyl-1-propanone hydrochloride.

References Cited
UNITED STATES PATENTS
3,037,991   6/1962   Szmuszkovicz ____ 260—326.15

ALEX MAZEL, Primary Examiner

J. A. NARCAVAGE, Assistant Examiner

U.S. Cl. X.R.
260—326.16; 424—274